United States Patent
Kim et al.

(10) Patent No.: US 11,188,816 B2
(45) Date of Patent: *Nov. 30, 2021

(54) NEUROMORPHIC CHIP AND METHOD AND APPARATUS FOR DETECTING SPIKE EVENT

(71) Applicants: Samsung Electronics Co., Ltd., Suwon-si (KR); POSTECH ACADEMY-INDUSTRY FOUNDATION, Pohang-si (KR)

(72) Inventors: Jun Seok Kim, Hwaseong-si (KR); Jae Yoon Sim, Pohang-si (KR); Hyun Surk Ryu, Hwaseong-si (KR)

(73) Assignees: Samsung Electronics Co., Ltd., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 24 days.

This patent is subject to a terminal disclaimer.

(21) Appl. No.: 16/748,979

(22) Filed: Jan. 22, 2020

(65) Prior Publication Data
US 2020/0160164 A1    May 21, 2020

Related U.S. Application Data

(63) Continuation of application No. 14/223,284, filed on Mar. 24, 2014, now Pat. No. 10,592,803.

(30) Foreign Application Priority Data

May 6, 2013    (KR) .......................... 10-2013-0050544

(51) Int. Cl.
*G06N 3/063*    (2006.01)
*G06N 3/04*     (2006.01)

(52) U.S. Cl.
CPC ............. *G06N 3/063* (2013.01); *G06N 3/049* (2013.01)

(58) Field of Classification Search
None
See application file for complete search history.

(56) References Cited

U.S. PATENT DOCUMENTS

| | | |
|---|---|---|
| 5,148,045 A | 9/1992 | Oyanagi |
| 5,218,646 A | 6/1993 | Sirat et al. |
| 5,920,852 A | 7/1999 | Graupe |
| | (Continued) | |

FOREIGN PATENT DOCUMENTS

| | | |
|---|---|---|
| KR | 10-2010-0129741 A | 12/2010 |
| KR | 10-2013-0013014 A | 2/2013 |

OTHER PUBLICATIONS

Boahen, Kwabena A., "Point-to-Point Connectivity Between Neuromorphic Chips Using Address Events", *IEEE Transactions on Circuits and Systems II: Analog and Digital Signal Processing*, vol. 47, Issue 5, May 2000 (pp. 416-434).

(Continued)

*Primary Examiner* — Daniel C Puentes
(74) *Attorney, Agent, or Firm* — NSIP Law (57) ABSTRACT

Disclosed are a method and an apparatus for detecting spike event or transmitting spike event information generated in a neuromorphic chip. The apparatus for detecting spike event generated in a neuromorphic chip may detect spike event information for a plurality of neurons included in the neuromorphic chip based on a neuron group.

20 Claims, 7 Drawing Sheets

(56) References Cited

U.S. PATENT DOCUMENTS

| | | |
|---|---|---|
| 6,192,352 B1 | 2/2001 | Alouani et al. |
| 6,366,945 B1 | 4/2002 | Fong et al. |
| 7,333,963 B2 | 2/2008 | Widrow et al. |
| 8,812,414 B2 | 8/2014 | Arthur et al. |
| 8,843,425 B2 | 9/2014 | Modha |
| 9,095,303 B2 | 8/2015 | Osorio |
| 9,104,974 B2 | 8/2015 | Sim et al. |
| 9,161,325 B1 | 10/2015 | Urbanek |
| 2002/0031255 A1 | 3/2002 | Kasdan et al. |
| 2004/0114800 A1 | 6/2004 | Ponomarev et al. |
| 2004/0126008 A1 | 7/2004 | Chapoulaud et al. |
| 2006/0020594 A1 | 1/2006 | Garg et al. |
| 2006/0224685 A1 | 10/2006 | Begun et al. |
| 2008/0177196 A1 | 7/2008 | Burdick et al. |
| 2009/0060352 A1 | 3/2009 | Distante et al. |
| 2010/0205541 A1 | 8/2010 | Rapaport et al. |
| 2010/0312730 A1 | 12/2010 | Weng et al. |
| 2011/0028859 A1 | 2/2011 | Chian |
| 2011/0153533 A1 | 6/2011 | Jackson et al. |
| 2011/0307079 A1 | 12/2011 | Oweiss et al. |
| 2012/0109864 A1 | 5/2012 | Modha |
| 2012/0303091 A1 | 11/2012 | Izhikevich |
| 2012/0308076 A1 | 12/2012 | Piekniewski et al. |
| 2013/0031039 A1* | 1/2013 | Sim ........................ G06N 3/049 706/26 |
| 2013/0031040 A1 | 1/2013 | Modha |
| 2013/0073497 A1* | 3/2013 | Akopyan ............... G06N 3/049 706/27 |
| 2014/0241211 A1 | 8/2014 | Zhang et al. |
| 2014/0330761 A1 | 11/2014 | Kim et al. |

OTHER PUBLICATIONS

Merolla, Paul A., et al., "Expandable Networks for Neuromorphic Chips." *IEEE Transactions on Circuits and Systems I: Regular Papers*, vol. 54, Issue 2, Feb. 2007 ( pp. 301-311).

Misra, Janardan, et al., "Artificial neural networks in hardware: A survey of two decades of progress." *Neurocomputing*, vol. 74, Issue 1-3, Dec. 2010 ( pp. 239-255).

Extended European Search Report dated Mar. 14, 2016 in counterpart European Application No. 14162787.7 (8 pages in English).

* cited by examiner

NEUROMORPHIC CHIP AND METHOD AND APPARATUS FOR DETECTING SPIKE EVENT

CROSS-REFERENCE TO RELATED APPLICATION(S)

This application is a continuation of U.S. patent application Ser. No. 14/223,284 filed on Mar. 24, 2014 which claims the benefit under 35 USC 119(a) of Korean Patent Application No. 10-2013-0050544 filed on May 6, 2013, in the Korean Intellectual Property Office, the entire disclosure of which is incorporated herein by reference for all purposes.

BACKGROUND

1. Field

The following description relates to neuromorphic chips and to methods and apparatus for detecting spike event or for transmitting spike event information of neurons of a neuromorphic chip.

2. Description of Related Art

A brain includes roughly 100 billion nerve cells, or neurons, that are interconnected with one another to form complex neural networks. Neurons are responsible for the intellectual capacity to learn and to memorize information. Neurons use their synapses to transmit and receive signals with thousands of other neurons. Neurons form a structural and functional unit of nervous system and a basic unit of information transmission. A synapse refers to a junction between neurons, in particular, between an axon of one neuron and a dendrite of another neuron. A neuron is connected to thousands of other neurons via synapses.

A neuromorphic chip refers to a semiconductor circuit that is designed to mimic an information processing scheme of a brain by forming, at a neuron level, an artificial nervous system mimicking the nervous system of a living organism.

A neuromorphic chip may be used in implementing an intelligent system that is capable of being adapted to an unspecified environment. This technology may be developed in applications of voice recognition, danger recognition, real-time fast signal processing, computers capable of recognition and estimation, robots, home appliances, micro mobile devices, security and monitoring, intelligent vehicle safety, autonomous navigation, and the like.

A communication channel is used to read a spike event occurring in a neuron included in a neuromorphic chip or to deliver event information to transmit the spike event to another neuron. An address event representation (AER) refers to a method of recording an address of a neuron in which a spike event has occurred, in a communication bus asynchronously with timing of a spike event occurrence.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of transmitting spike event information, the method involving: determining whether a spike event occurred in a neuron group among a plurality of neuron groups in a neuromorphic chip; and identifying address information of a neuron in which the spike event occurred and transmitting the identified address information.

The general aspect of the method may further include, before the determining of whether the spike event occurred, grouping neurons in the neuromorphic chip into the plurality of neuron groups. The transmitting may involve transmitting the identified address information out of the neuromorphic chip.

In response to a determination that the spike event occurred in the neuron group, the determining may involve determining whether a neuron subgroup of the neuron group includes a neuron in which the spike event occurred.

The determining may involve: identifying a neuron group in which a spike event did not occur; and determining, for a remaining neuron group other than the identified neuron group, whether a spike event occurred in a neuron subgroup of the neuron group.

The address information of the neuron in which the spike event occurred may involve address information of the neuron group in which the spike event occurred and address information of the neuron in which the spike event occurred within the neuron group.

The transmitting may involve: identifying, for the neuron in which the spike event occurred, timing information in which the spike event occurred; and transmitting the address information of the neuron in which the spike event occurred and the timing information through a synchronized channel.

The determining may involve determining whether the spike event occurred in the neuron group using a one clock cycle.

In another general aspect, there is provided a method of detecting a spike event, the method involving: determining whether a spike event occurred in a neuron group among a plurality of neuron groups in a neuromorphic chip; and determining, for a neuron group in which the spike event occurred, whether a spike event occurred in a neuron subgroup of the neuron group.

The general aspect of the method may further involve, before the determining of whether the spike event occurred, grouping neurons in the neuromorphic chip into the plurality of neuron groups.

The determining of whether the spike event occurred in the neuron group may involve determining whether the spike event occurred in the neuron group during a one clock cycle.

The determining of whether the spike event occurred in the neuron subgroup may involve determining whether the spike event occurred in the neuron subgroup during a one clock cycle.

The neuron subgroup may correspond to a neuron group including fewer neurons than a number of neurons included in the neuron group.

In another general aspect, there is provided a neuromorphic chip including: a plurality of neurons configured to generate a spike event based on an amount of current received through a synapse; and a spike event detection unit configured to detect whether a spike event occurred in the plurality of neurons, in which the spike event detection unit is configured to detect whether a spike event occurred in a neuron based on neuron groups.

The spike event detection unit may be configured to group the plurality of neurons into the neuron groups before detecting whether the spike event occurred.

In response to a determination that the spike event occurred in a neuron group, the spike event detection unit may be configured to determine whether a neuron subgroup of the neuron group includes a neuron in which the spike event occurred.

In response to a determination that the spike event did not occur in a neuron group, the spike event detection unit may be configured to omit a spike event detection operation based on a neuron subgroup.

The spike event detection unit may be configured to adjust at least one of a number of neuron groups to be generated through grouping and a depth of a neuron group based on at least one of a number of neurons included in the neuromorphic chip and a number of occurrences of a spike event.

At least one of the neuron groups may include a neuron subgroup, the spike event detection unit being configured to adjust a size of the neuron subgroup based on at least one of a number of neurons included in the neuromorphic chip and a number of occurrences of a spike event.

The general aspect of the neuromorphic chip may further include: a spike event information transmission unit configured to identify address information of a neuron in which the spike event occurred and timing information in which the spike event occurred, and transmit the identified address information and the identified timing information.

The spike event information transmission unit may be configured to identify address information of a neuron group including the neuron in which the spike event occurred and address information of the neuron in which the spike event occurred, and to transmit the identified address information.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
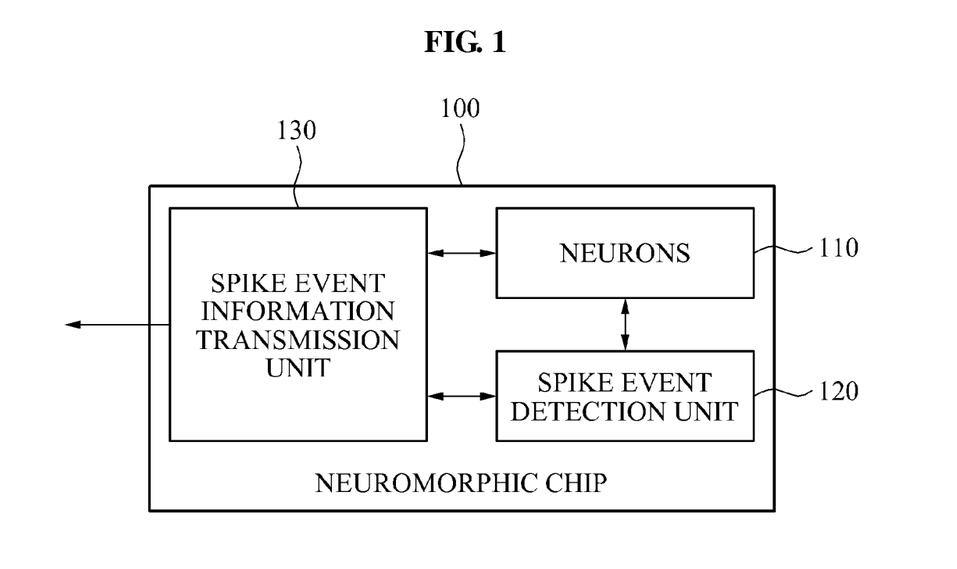
FIG. 1 is a diagram illustrating an example of a neuromorphic chip.

FIG. 1 is a diagram illustrating an example of a neuromorphic chip 100.

The neuromorphic chip 100 may transmit, out of the neuromorphic chip 100, spike event information of neurons 110 included in the neuromorphic chip 100. The spike event information may include address information of a neuron in which a spike event has occurred and timing information at which the spike event has occurred.

The neuromorphic chip 100 may detect or scan a neuron generating or firing a spike event based on a neuron group, for example, a collection of the neurons 110. The neuromorphic chip 100 may determine the occurrence of the spike event for each neuron group rather than determining the occurrence of the spike event for each of the neurons 110 independently, to improve a transmission efficiency of spike event information.

Referring to FIG. 1, the neuromorphic chip 100 may include a plurality of neurons 110 that generate a spike event based on an amount of current received through a synapse, a spike event detection unit 120, and a spike event information transmission unit 130.

When an amount of current received through a synapse is greater than a preset threshold value, a neuron 110 may generate a spike event. When the amount of current is less than the preset threshold value, the neuron 110 may not generate a spike event. That is, the spike event may be generated when the current reaches a threshold value, similar to an action potential in a neuron that is triggered at a threshold potential. Each of the neurons 110 may have unique address information for identifying a neuron that generated or fired a spike event in the neuromorphic chip 100.

The spike event detection unit 120 may detect a spike event of a neuron. In order to detect a spike event, the spike event detection unit 120 may group the neurons 110 included in the neuromorphic chip 100 into a plurality of neuron groups.

The spike event detection unit 120 may group the neurons 110 based on at least one of the number of neurons or the frequency or ratio of occurrences of spike events in order to adjust the number of neuron groups that are generated or a depth of the neuron groups that are generated. For example, the spike event detection unit 120 may determine the number of neuron groups to be generated, based on a number of neurons that are included in the neuromorphic chip 100. The spike event detection unit 120 may, for example, generated a higher number of neuron groups when the number of neurons in the neuromorphic chip 100 increases. Also, when a number of occurrences of a spike event is less than a preset threshold value, the spike event detection unit 120 may reduce a number of neuron groups that are to be generated by increasing a number of neurons to be included in one neuron group or may adjust a depth of a neuron group to be lower than a previous depth. Here, the depth of the neuron group may correspond to a hierarchical model order in the hierarchical model of the neuron group. For example, a higher-order hierarchical model may indicate that neuron groups are structured in a larger number of hierarchies or tiers.

The spike event detection unit 120 may detect whether a spike event has occurred based on the neuron groups generated based on the hierarchical model. The spike event detection unit 120 may detect whether a spike event has occurred per clock cycle. For example, the spike event detection unit 120 may determine whether or not a spike event has occurred in a neuron group or a neuron during one clock cycle.

The occurrence of a spike event in a neuron group may imply that the neuron group includes at least one neuron in which the spike event has occurred. The non-occurrence of a spike event in a neuron group may imply that a neuron in which a spike event has occurred is not included in a corresponding neuron group.

The spike event detection unit 120 may detect a spike event of a neuron based on a hierarchical model, such as a nested set model. For example, the spike event detection unit 120 may set a neuron subgroup of a neuron group by further dividing the neurons in the neuron group into one or more neuron subgroups. A neuron group that includes one or more neuron subgroups may correspond to a higher-level neuron group. In this example, a neuron subgroup may correspond to a group of neurons including fewer neurons than the neuron group.

The spike event detection unit 120 may adjust a size of a neuron subgroup that is included in a neuron group based on at least one of a number of neurons included in the neuromorphic chip 100 and a number of occurrences of spike event. For example, when a number of occurrences of spike event in a neuron is less than a preset threshold value, the spike event detection unit 120 may increase a number of neurons included in a neuron subgroup by increasing a size of the neuron subgroup, and vice versa. A neuron subgroup may include a lower-level neuron group of the neuron subgroup, and the lower-level neuron group may belong to the neuron subgroup and may correspond to a neuron group including fewer neurons than those of the neuron subgroup.

When a spike event occurs in a neuron group, the spike event detection unit 120 may detect whether the spike event has occurred based on a neuron subgroup constituting the neuron group. For a neuron group in which a spike event did not occur, the spike event detection unit 120 may not perform an operation of detecting a spike event.

For example, the spike event detection unit 120 may detect whether a spike event has occurred in an order of: a higher-level neuron group in which a spike event has occurred→ a neuron subgroup included in the higher-level neuron group→ a neuron group lower in level than the neuron subgroup→ . . . → a lowest-level neuron group-→neurons included in the lowest-level neuron group. For a neuron group in which a spike event did not occur during a predetermined length of time, the spike event detection unit 120 may not perform the determining as to whether a spike event has occurred. Accordingly, the spike event detection unit 120 may reduce a number of clock cycles necessary for detecting the occurrence of spike event and reduce power consumption due to a reduced number of clock cycles necessary.

In the event that it is determined that a spike event has occurred in a lowest-level neuron group, the spike event detection unit 120 may individually determine whether a spike event has occurred for each of the neurons 110 included in the lowest-level neuron group. The lowest-level neuron group may correspond to a neuron group including a fewest number of neurons located at a lowest level in a hierarchical model of neuron groups. When a spike event has occurred in a lowest-level neuron group, the spike event detection unit 120 may detect the spike event based on individual neurons, rather than based on the neuron groups.

The spike event information transmission unit 130 may identify address information of a neuron in which a spike event has occurred, and transmit, out of the neuromorphic chip 100, the identified address information. The address information of the neuron may include address information of a neuron group including the neuron and address information of the corresponding neuron within the neuron group. The address information of the neuron group that includes the neuron in which the spike event has occurred may be determined based on a lowest-level neuron group.

Also, the spike event information transmission unit 130 may identify timing information at which a spike event of a neuron has occurred, and transmit, out of the neuromorphic chip 100, the identified timing information. Further, the spike event information transmission unit 130 may separate address information of the neuron in which the spike event has occurred from the timing information, and transmit the address information and the timing information through a synchronized channel. For example, the timing information may include strobe information representing whether a spike event has occurred. In this example, when a spike event occurs, the strobe information may be represented as "1", and when a spike event does not occur, the strobe information may be represented as "0". The spike event information transmission unit 130 may synchronize address information of a neuron in which a spike event has occurred and timing information in which the spike event of the neuron has occurred, and transmit the address information and the timing information.

Figure 2:
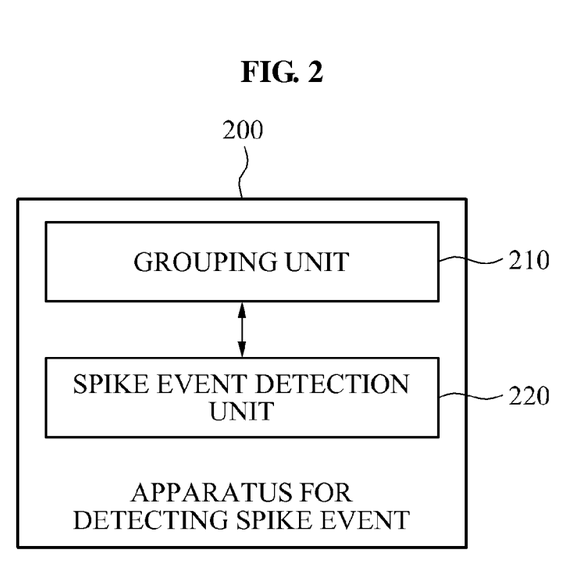
FIG. 2 is a diagram illustrating an example of an apparatus for detecting a spike event.

FIG. 2 is a diagram illustrating an example of an apparatus 200 for detecting a spike event.

The apparatus 200 for detecting a spike event may detect a spike event generated by a neuron. The apparatus 200 for detecting a spike event may be embedded in a neuromorphic chip or may operate outside of a neuromorphic chip. Referring to FIG. 2, the apparatus 200 for detecting a spike event may include a grouping unit 210 and a spike event detection unit 220.

The grouping unit 210 may group neurons included in a neuromorphic chip into a plurality of neuron groups. The grouping unit 210 may adjust a number of neuron groups to be generated through performing grouping based on a number of neurons included in the neuromorphic chip. Alternatively, the grouping unit 210 may adjust a number of neuron groups to be generated through performing grouping based on a number of occurrences of a spike event of a neuron. For example, when a number of occurrences of a spike event is less than a preset threshold value, the grouping unit 210 may reduce a number of neuron groups to be generated by increasing a number of neurons to be included in a neuron group.

The grouping unit 210 may group neurons into hierarchical neuron groups based on a hierarchical model. For example, the grouping unit 210 may set a neuron subgroup of a neuron group and a lower-level neuron group of a neuron subgroup hierarchically. The grouping unit 210 may adjust a size of a neuron subgroup constituting a neuron group and a depth of the neuron group based on at least one of a number of neurons included in the neuromorphic chip 100 and a number of occurrences of a spike event.

The spike event detection unit 220 may determine whether a spike event has occurred in a neuron group for each neuron group included in the neuromorphic chip, and identify address information of a neuron in which a spike event has occurred.

In response to a determination that a neuron group includes a neuron in which a spike event has occurred, the spike event detection unit 220 may determine whether a neuron subgroup of the neuron group includes the neuron in which the spike event has occurred.

In the event that a spike event did not occurred in a neuron group, the spike event detection unit 220 may determine, for remaining neuron groups other than the corresponding neuron group, whether a spike event has occurred in a neuron subgroup of the neuron group. For a neuron group in which a spike event has not occurred, the spike event detection unit 220 may not perform a spike event detection operation based on a neuron subgroup. When it is determined that a spike event has occurred in a lowest-level neuron group, the spike event detection unit 220 may determine whether a spike event has occurred for each neuron included in the lowest-level neuron group.

Figure 3:
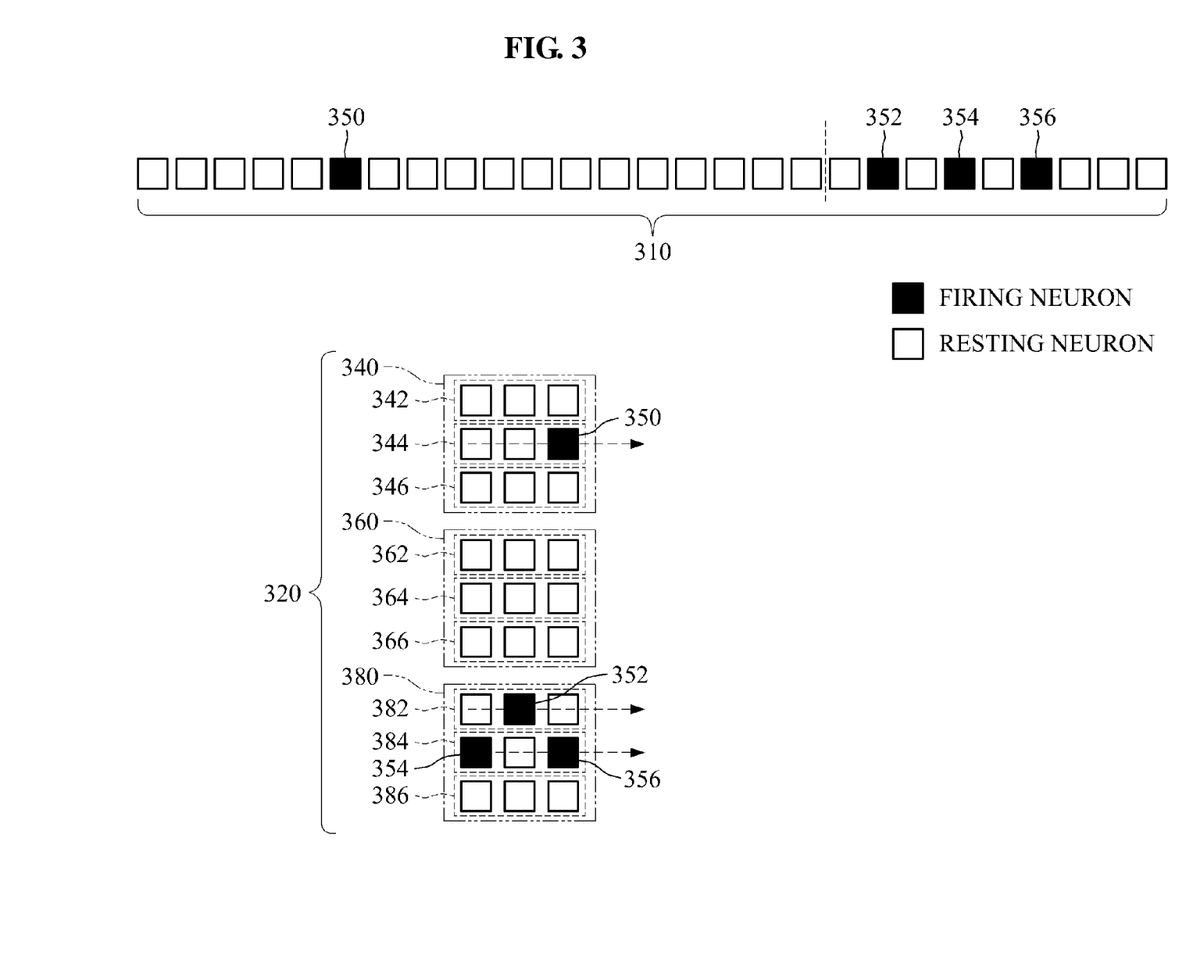
FIG. 3 is a diagram illustrating an example of a method of detecting a spike event.

FIG. 3 is a diagram illustrating an example of a method of detecting a spike event.

Referring to FIG. 3, an example of a method 310 of detecting a spike event without grouping of neurons is described in which a neuromorphic chip holds twenty seven neurons. A pike event has occurred in arbitrary four neurons 350, 352, 354, and 356 among the twenty seven neurons.

For the non-grouped neurons, a minimum of twenty seven clock cycles may be required to detect a spike event. Accordingly, a number of clock cycles required to detect a spike event may be determined based on a number of neurons included in a neuromorphic chip, irrespective of a number of neurons in which a spike event has occurred or a number of occurrences of a spike event. For the non-grouped neurons, a minimum number of clock cycles or a minimum clock frequency required to detect a spike event may increase in proportion to a number of neurons included in a neuromorphic chip.

Hereinafter, another method of detecting a spike event is described. According to a method 320, an apparatus for detecting a spike event is configured to group twenty seven neurons into neuron groups and to detect a spike event based on the neuron groups. Referring to FIG. 3, the apparatus for detecting spike event groups twenty seven neurons into three neuron groups 340, 360, and 380 is illustrated. Each of the neuron groups 340, 360, and 380 may include nine neurons. Also, the neuron group 340 may include neuron subgroups 342, 344, and 346; the neuron group 360 may include neuron subgroups 362, 364, and 366; and the neuron group 380 may include neuron subgroups 382, 384, and 386. A size and a shape of a neuron group or a neuron subgroup are not limited to the foregoing examples, and various modifications may be made.

First, the apparatus for detecting a spike event may determine whether a spike event has occurred in the neuron groups 340, 360, and 380. The apparatus for detecting a spike event may determine that a spike event has occurred in the neuron groups 340 and 380 because the neuron groups 340 and 380 include a neuron in which a spike event has occurred. For the neuron groups 340, 360, and 380, a minimum of three clock cycles may be required to determine whether a spike event has occurred.

Subsequently, for the neuron groups 340 and 380 in which the spike event has occurred, the apparatus for detecting a spike event may determine whether the spike event has occurred based on a neuron subgroup. The apparatus for detecting a spike event may determine that the neuron group 360 does not include any neuron in which a spike event has occurred because a spike event has not occurred in the neuron group 360. Accordingly, the apparatus for detecting a spike event may not perform a spike event detection operation on the neuron group 360.

The apparatus for detecting a spike event may determine whether the spike event has occurred in the neuron subgroups 342, 344, and 346 of the neuron group 340 and the neuron subgroups 382, 384, and 386 of the neuron group 380. For the neuron subgroups 342, 344, 346, 382, 384, and 386, a minimum of six clock cycles may be required to determine whether a spike event has occurred.

In FIG. 3, the apparatus for detecting a spike event may determine whether a spike event has occurred for each of the neurons included in the neuron subgroups 344, 382, 384 in which the spike event has occurred because a neuron subgroup corresponds to a lowest-level neuron group. For the neuron subgroups 342, 344, 346, 382, 384, and 386 in which a spike event has not occurred, the apparatus for detecting a spike event may not perform a spike event detection operation based on a neuron subgroup. For the neurons included in the neuron subgroups 344, 382, 384, a minimum of nine clock cycles may be required to determine whether a spike event has occurred.

In the above example, for the neurons 350, 352, 354, and 356, a minimum number of clock cycles required by the method 310 of detecting a spike event without grouping of neurons is twenty seven. On the other hand, a minimum number of clock cycles required by the method 320 of detecting a spike event based on a neuron group is eighteen. Accordingly, the method 320 of detecting a spike event based on a neuron group may be found to be more effective in detecting a spike event than the method 310 of detecting a spike event without grouping of neurons. For example, in a winner-take-all (WTA) scenario such as a case in which a spike event has occurred in only a particular neuron among all neurons included in a neuromorphic chip, a method of detecting a spike event based on a neuron group may be more effective.

Figure 4:
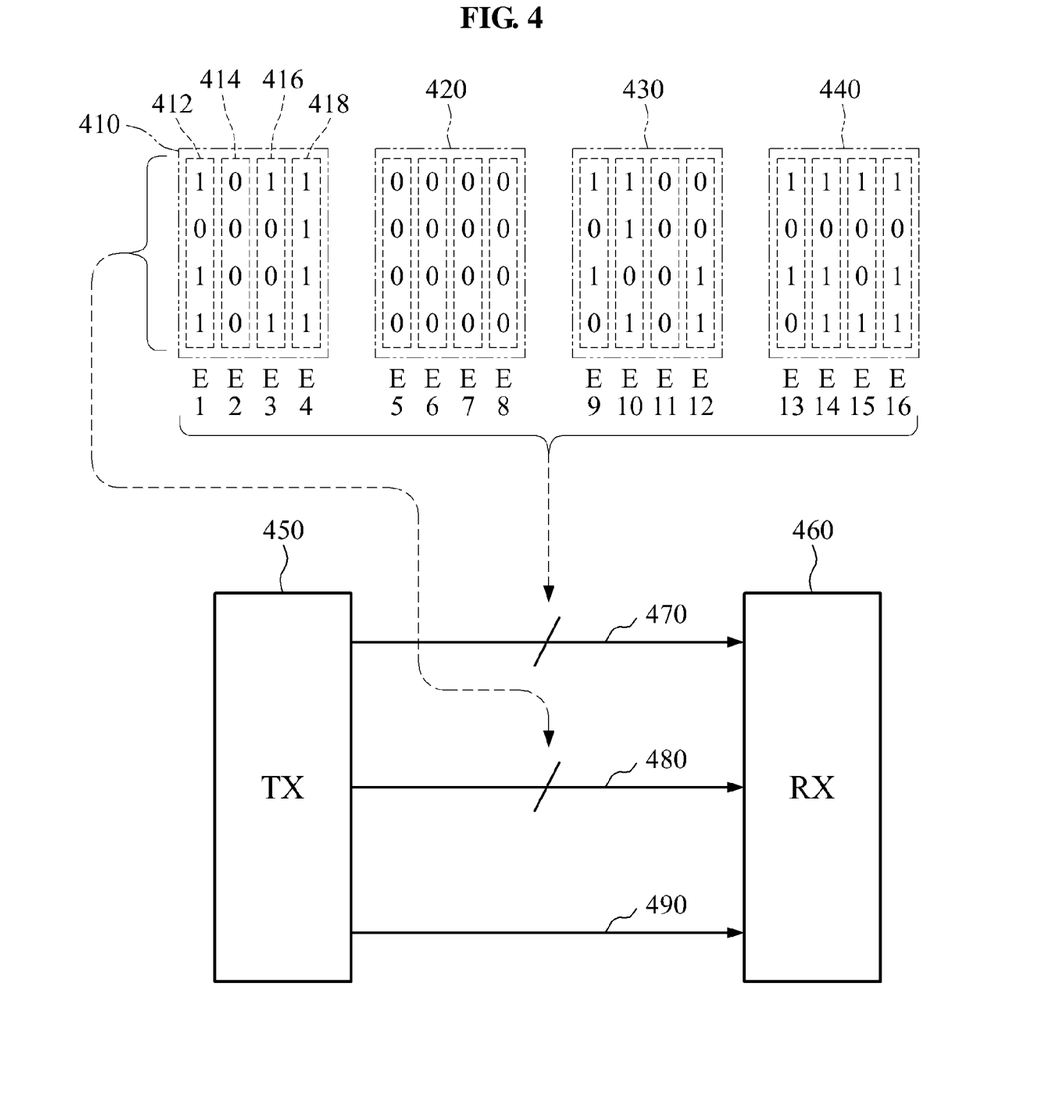
FIG. 4 is a diagram illustrating an example of a method of transmitting spike event information of a neuron.

FIG. 4 is a diagram illustrating an example of a method of transmitting spike event information of a neuron.

Referring to FIG. 4, a method of allocating address information of a neuron to transmit spike event information for a neuromorphic chip that includes sixty four neurons is illustrated. When a depth of a neuron group is set to 3, as illustrated in FIG. 4, an address for identifying a lowest-level neuron group and an address for identifying each neuron included in a lowest-level neuron group may be required to allocate the address information of a neuron in which a spike event took place. In FIG. 4, four neuron groups 410, 420, 430, and 440 are illustrated, and each of the neuron groups 410, 420, 430, and 440 includes four neuron subgroups. In this example, a neuron subgroup corresponds to a lowest-level neuron group because a depth of a neuron group is 3.

For example, an address of a neuron subgroup may be represented by 4 bits in binary because sixteen neuron subgroups are provided. In this example, an address of a neuron in a neuron subgroup may be represented by 2 bits in binary because each neuron subgroup includes four neurons. In this example, a 4-bit bus 470 may be used to transmit address information of a neuron group between a transmitter TX 450 transmitting spike event information and a receiver RX 460 receiving spike event information, and a 2-bit bus 480 may be used to transmit address information of a neuron. Also, a bus 490 may be used to transmit timing information regarding a spike event between the transmitter 450 and the receiver 460, and the timing information may include strobe information indicating whether a spike event has occurred. The address information of a neuron and the timing information may be transmitted through a synchronized channel.

Figure 5:
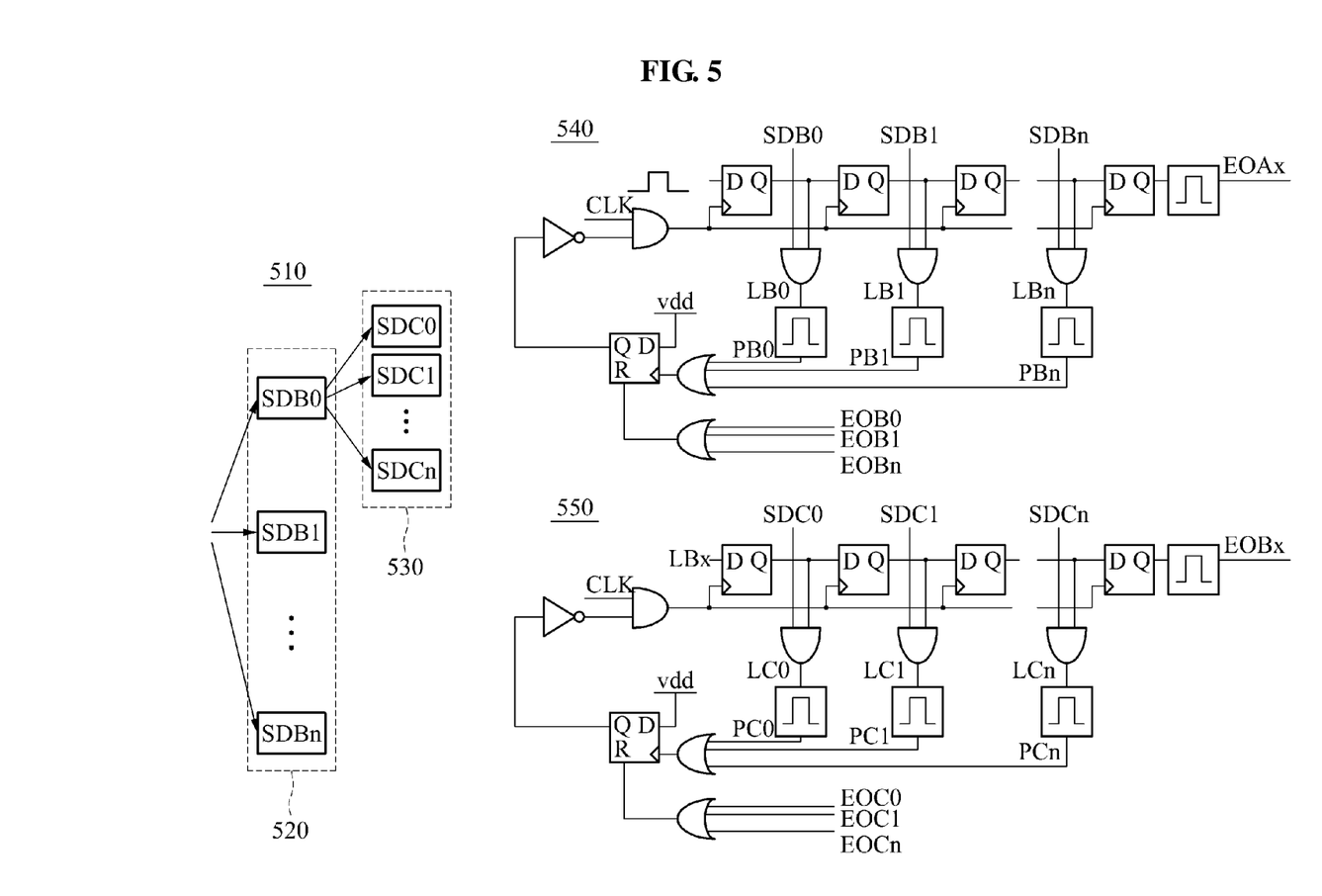
FIG. 5 is a diagram illustrating an example of a circuit for detecting a spike event.

FIG. 5 is a diagram illustrating an example of a circuit for detecting a spike event.

A hierarchical structure 510 illustrates a basic structure used in an apparatus for detecting a spike event to detect a spike event of a neuron. Referring to FIG. 5, the hierarchical structure 510 includes neuron groups SDB0, SDB1, . . . SDBn 520 and neuron subgroups that are included in the neuron groups SDB0, SDB1, . . . SDBn 520. For example, the neuron group SDB0 includes neuron subgroups SDC0, SDC1, . . . SDCn 530. The apparatus for detecting a spike event may determine whether a spike event has occurred in the neuron groups 520, and determine, for only a neuron group in which a spike event has occurred, whether a spike event has occurred based on a neuron subgroup.

A circuit diagram 540 illustrates an example of a circuit for detecting whether a spike event has occurred in the neuron groups SDB0, SDB1, . . . SDBn 520, and a circuit diagram 550 illustrates an example of a circuit for detecting whether a spike event has occurred in the neuron subgroups SDC0, SDC1, . . . SDCn 530 of the neuron group SDB0. The circuit diagrams 540 and 550 may include a device for generating a clock cycle and logic devices.

Figure 6:
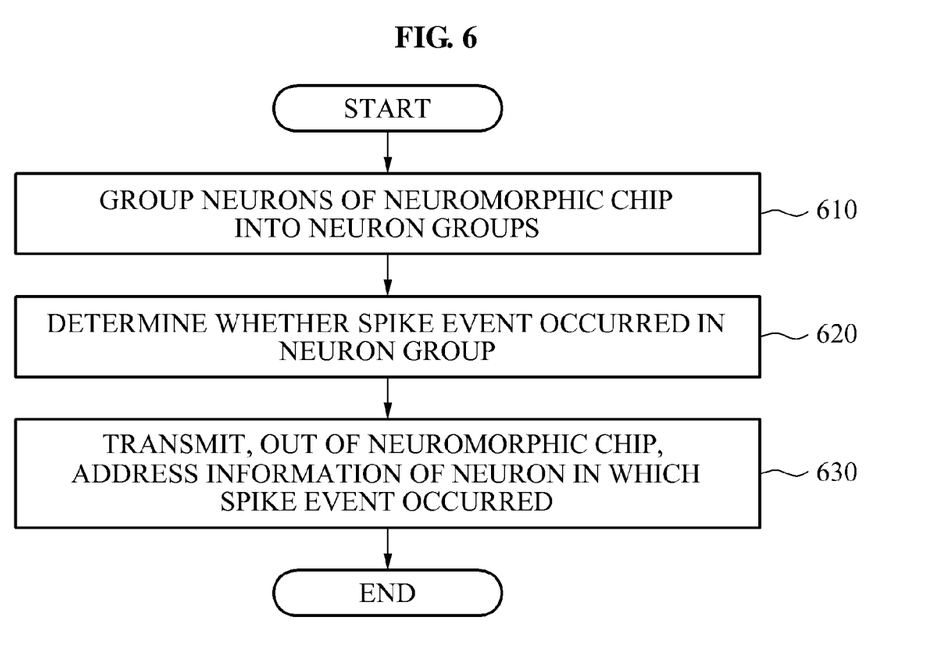
FIG. 6 is a flowchart illustrating an example of a method of transmitting spike event information.

FIG. 6 is a flowchart illustrating an example of a method of transmitting spike event information.

In 610, the spike event detection unit may group neurons included in a neuromorphic chip into a plurality of neuron groups. A number of neuron groups to be generated through grouping may be adjusted based on a number of neurons included in the neuromorphic chip or based on a number of occurrences of a spike event.

The neurons may be grouped hierarchically based on a hierarchical model. For example, a neuron subgroup of a neuron group and a lower-level neuron group of a neuron subgroup may be set hierarchically. A size of a neuron subgroup constituting a neuron group or a depth of a neuron group may be adjusted based on at least one of a number of neurons included in the neuromorphic chip and a number of occurrences of a spike event.

In 620, the spike event detection unit may determine whether a spike event has occurred in each neuron group among the plurality of neuron groups included in the neuromorphic chip. When a spike event has occurred in a neuron group, the spike event detection unit may determine whether a neuron subgroup of the neuron group includes a neuron in which the spike event has occurred. The spike event detection unit may determine whether a neuron in which a spike event has occurred is included in a neuron group during a one clock cycle or a predetermined time period.

The spike event detection unit may identify a neuron group in which a spike event did not occur during the one clock cycle or the predetermined time period. For one or more remaining groups other than the identified neuron group, the spike event detection unit may determine whether a neuron subgroup of the neuron group includes a neuron in which a spike event has occurred. For a neuron group in which a spike event did not occur, the spike event detection unit may not perform a spike event detection operation.

In 630, in a neuron group in which a spike event has occurred, the spike event information transmission unit may identify address information of a neuron in which the spike event has occurred and may transmit, out of the neuromorphic chip, the identified address information of the neuron in which the spike event has occurred. The address information of the neuron in which the spike event has occurred may include address information of the neuron group in which the spike event has occurred and address information of the neuron in which the spike event has occurred within the neuron group.

Also, for the neuron in which the spike event has occurred, the spike event information transmission unit may identify timing information in which the spike event has occurred. The spike event information transmission unit may transmit, out of the neuromorphic chip, the address information of the neuron in which the spike event has occurred and the timing information, through a synchronized channel.

Figure 7:
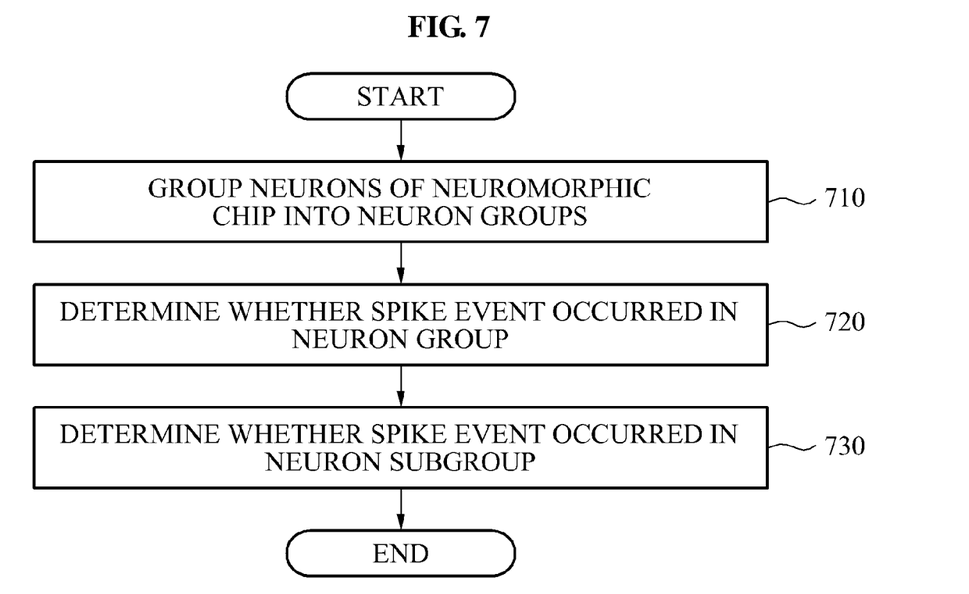
FIG. 7 is a flowchart illustrating an example of a method of detecting a spike event.

FIG. 7 is a flowchart illustrating an example of a method of detecting a spike event.

In 710, an apparatus for detecting a spike event may group neurons included in a neuromorphic chip into a plurality of neuron groups. The apparatus for detecting a spike event may adjust a number of neuron groups to be generated through grouping or a depth of a neuron group based on at least one of a number of neurons included in the neuromorphic chip of a number of occurrences of a spike event.

The apparatus for detecting a spike event may group the neurons hierarchically based on a hierarchical model. The apparatus for detecting a spike event may set a neuron subgroup of a neuron group and a lower-level neuron group of a neuron subgroup hierarchically. For the neuron groups that are generated, the apparatus for detecting a spike event may determine whether a spike event has occurred in a sequential order.

In 720, the apparatus for detecting a spike event may determine whether a spike event has occurred in a neuron group. The apparatus for detecting a spike event may determine whether a spike event has occurred in a neuron group during a one clock cycle.

In 730, for a neuron group in which a spike event has occurred, the apparatus for detecting a spike event may determine whether the spike event has occurred in a neuron subgroup of the neuron group. The apparatus for detecting a spike event may determine whether a spike event has occurred in a neuron subgroup during a one clock cycle. For a neuron group in which a spike event did not occur, the apparatus for detecting a spike event may not perform a spike event detection operation based on a neuron subgroup. The apparatus for detecting a spike event may continue to perform a spike event detection operation based on a neuron group until the spike event detection operation is performed on a lowest-level neuron group. When the spike event detection operation for the lowest-level neuron group is completed, the apparatus for detecting a spike event may determine whether a spike event has occurred for each of the neurons included in the lowest-level neuron group.

Described above are various examples of methods and apparatuses for detecting spike event or transmitting spike event information. In one example, there is provided a method of transmitting spike event information of a neuromorphic chip, the method including grouping neurons included in a neuromorphic chip into a plurality of neuron groups, determining whether a spike event occurs in a neuron group per neuron group, and identifying address information of a neuron in which the spike event occurs and transmitting, out of the neuromorphic chip, the identified address information of the neuron in which the spike event occurs.

In another example, there is provided a method of detecting a spike event of a neuromorphic chip, the method including grouping neurons included in a neuromorphic chip into a plurality of neuron groups, determining whether a spike event occurs in a neuron group, and determining, for a neuron group in which the spike event occurs, whether a spike event occurs in a neuron subgroup of the neuron group.

In still another example, there is provided a neuromorphic chip including a plurality of neurons to generate a spike event based on an amount of current received through a synapse, and a spike event detection unit to detect whether a spike event occurs in the neurons.

The spike event detection unit may group the plurality of neurons and may detect whether a spike event occurs based on the grouped neuron group.

The neuromorphic chip may further include a spike event information transmission unit to identify address information of a neuron in which the spike event occurs and timing information in which the spike event occurs, and to transmit, out of the neuromorphic chip, the identified address information and the identified timing information.

The spike event detection unit may include a grouping unit to group neurons included in the neuromorphic chip into a plurality of neuron groups, and a spike event detection unit to determine whether a spike event occurs in a neuron group per neuron group and to identify address information of a neuron in which the spike event occurs.

The spike event detection unit may include a processor.

The methods described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be those well-known and available to those having skill in the computer software arts. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

The various units described above may be implemented using one or more hardware components, one or more software components, or a combination of one or more hardware components and one or more software components. A hardware component may be, for example, a physical device that physically performs one or more operations, such as processing devices, processors, amplifiers, memory, circuits, devices for generating clock cycle, logic devices, and the like, but is not limited thereto.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of identifying spike event information in a neuromorphic processor including neurons and synapses connecting the neurons, the method comprising:
    determining whether a spike event occurred in a neuron group from among neuron groups in a neuromorphic chip, during at least one clock cycle of which a number is not greater than a number of the neuron groups;
    determining whether the spike event occurred in a neuron subgroup, from among neuron subgroups in the neuron group in which the spike event occurred, during at least one clock cycle of which a number is not greater than a number of the neuron subgroups; and
    identifying address information of a neuron in which the spike event occurred, from among neurons in the neuron subgroup in which the spike event occurred, during at least one clock cycle of which a number is not greater than a number of neurons in the neuron subgroup in which the spike event occurred.

2. The method of claim 1, further comprising:
    grouping neurons in the neuromorphic chip into the neuron groups; and
    grouping neurons in each of neuron groups into the neuron subgroups.

3. The method of claim 1, further comprising:
    determining whether the spike event occurred in a current neuron, in response to an amount of current received by the current neuron through a synapse being greater than a threshold value.

4. The method of claim 1, wherein the determining of whether the spike event occurred in the neuron group subgroup comprises:
    determining whether a spike event occurred in a neuron subgroup comprised in another neuron group.

5. The method of claim 1, wherein the address information of the neuron in which the spike event occurred comprises address information of the neuron group in which the spike event occurred and address information of the neuron subgroup in which the spike event occurred.

6. The method of claim 1, further comprising:
    transmitting the identified address information out of the neuromorphic chip.

7. The method of claim 6, wherein the transmitting comprises:
    identifying a time when the spike event occurred; and
    transmitting the address information of the neuron in which the spike event occurred and information on the identified time, through a synchronized channel.

8. The method of claim 1, wherein the determining whether the spike event occurred in the neuron group comprises:
 determining whether the spike event occurred in the neuron group using one clock cycle.

9. A non-transitory computer-readable storage medium storing instructions that, when executed by a processor, cause the processor to perform the method of identifying spike event information of claim 1.

10. A neuromorphic chip comprising:
 neurons; and
 a processor is configured to:
  determine a neuron group in which a spike event occurred, from among neuron groups in a neuromorphic chip, during at least one clock cycle of which a number is not greater than a number of the neuron groups,
  determine a neuron subgroup in which the spike event occurred, from among neuron subgroups in the determined neuron group, during at least one clock cycle of which a number is not greater than a number of the subgroups, and
  identify address information of a neuron in which the spike event occurred, from among neurons in the determined neuron subgroup, during at least one clock cycle of which a number is not greater than a number of neurons in the determined neuron subgroup.

11. The neuromorphic chip of claim 10, wherein the processor is further configured to:
 group the neurons into the neuron groups, and
 group neurons in each of neuron groups into the neuron subgroups.

12. The neuromorphic chip of claim 10, wherein the processor is further configured to:
 determine whether the spike event occurred in a current neuron, in response to an amount of current received by the current neuron through a synapse being greater than a threshold value.

13. The neuromorphic chip of claim 10, wherein the address information of the neuron in which the spike event occurred comprises address information of the determined neuron group and address information of the determined neuron subgroup.

14. The neuromorphic chip of claim 10, wherein the identified address information and information on a time when the spike event occurred are transmitted out of the neuromorphic chip.

15. The neuromorphic chip of claim 10, wherein the processor is further configured to:
 determine whether the spike event occurred in the neuron group using one clock cycle from among clock cycles.

16. The neuromorphic chip of claim 10, wherein the processor is further configured to omit a spike event detection operation for a neuron subgroup of a particular neuron group, in case that a spike event did not occur in the particular neuron group.

17. The neuromorphic chip of claim 10, wherein the processor is further configured to adjust a number of the neuron groups through grouping of the neurons or a depth of a neuron group based on at least one of a number of neurons included in the neuromorphic chip or a number of occurrences of a spike event.

18. The neuromorphic chip of claim 17, wherein the processor is further configured to increase a number of neurons in the neuron groups or to decrease a depth of the neuron groups, in response to the number of occurrences of the spike event being less than a threshold value.

19. The neuromorphic chip of claim 10, wherein the processor is further configured to adjust a size of the neuron subgroup based on at least one of a number of neurons included in the neuromorphic chip or a number of occurrences of a spike event.

20. The neuromorphic chip of claim 19, wherein the processor is further configured to increase a number of neurons in the neuron subgroups, in response to the number of occurrences of the spike event being less than a threshold value.

* * * * *